(12) United States Patent
Jami

(10) Patent No.: US 12,534,403 B2
(45) Date of Patent: Jan. 27, 2026

(54) VEGETAL CONCRETE MASONRY UNIT AND METHOD AND SYSTEM FOR MANUFACTURE THEREOF

(71) Applicant: GREENJAMS BUILDTECH PRIVATE LIMITED, Andhra Pradesh (IN)

(72) Inventor: Tarun Jami, Visakhapatnam (IN)

(73) Assignee: Greenjams Buildtech Private Limited (IN)

( * ) Notice: Subject to any disclaimer, the term of this patent is extended or adjusted under 35 U.S.C. 154(b) by 771 days.

(21) Appl. No.: 17/793,579

(22) PCT Filed: Jan. 21, 2021

(86) PCT No.: PCT/IN2021/050055
§ 371 (c)(1),
(2) Date: Jul. 18, 2022

(87) PCT Pub. No.: WO2021/149076
PCT Pub. Date: Jul. 29, 2021

(65) Prior Publication Data
US 2023/0054357 A1    Feb. 23, 2023

(30) Foreign Application Priority Data
Jan. 21, 2020   (IN) .............. 202041002654

(51) Int. Cl.
C04B 12/00    (2006.01)
B28B 1/52    (2006.01)
(Continued)

(52) U.S. Cl.
CPC ............ *C04B 12/005* (2013.01); *B28B 1/525* (2013.01); *B28B 3/02* (2013.01); *C04B 7/34* (2013.01); *C04B 18/106* (2013.01); *C04B 18/141* (2013.01); *C04B 18/24* (2013.01); *C04B 28/005* (2013.01); *C04B 28/006* (2013.01);
(Continued)

(58) Field of Classification Search
CPC ... C04B 18/24; C04B 418/248; C04B 12/005; C04B 7/34; C04B 18/106; C04B 18/141; C04B 28/005; C04B 28/006; C04B 28/08; C04B 28/12; C04B 2103/0091; C04B 2103/10; C04B 2111/00017; C04B 12/04; C04B 18/08; C04B 18/142; C04B 18/248; C04B 22/062; C04B 22/064;
(Continued)

(56) References Cited

U.S. PATENT DOCUMENTS 9,388,072 B1 * 7/2016 Niven .................. B28C 5/462
11,180,414 B1 * 11/2021 Shahsavari ............ C04B 14/30
(Continued)

OTHER PUBLICATIONS

International Search Report and Written Opinion of the International Searching Authority issued in PCT/IN2021/050055, mailed May 11, 2021; ISA/IN.
(Continued)

*Primary Examiner* — Jeffrey M Wollschlager
(74) *Attorney, Agent, or Firm* — Harness, Dickey & Pierce, P.L.C.

(57) ABSTRACT

A vegetal concrete masonry unit is provided which comprises cooked crop residues, binder and pulverized fuel ash in a mass ratio of 1:1:1.5 to 1:1.5:3.

9 Claims, 2 Drawing Sheets

(51) Int. Cl.
| | |
|---|---|
| B28B 3/02 | (2006.01) |
| C04B 7/34 | (2006.01) |
| C04B 18/10 | (2006.01) |
| C04B 18/14 | (2006.01) |
| C04B 18/24 | (2006.01) |
| C04B 28/00 | (2006.01) |
| C04B 28/08 | (2006.01) |
| C04B 28/12 | (2006.01) |
| C04B 103/00 | (2006.01) |
| C04B 103/10 | (2006.01) |
| C04B 111/00 | (2006.01) |

(52) U.S. Cl.
CPC .............. *C04B 28/08* (2013.01); *C04B 28/12* (2013.01); *C04B 2103/0091* (2013.01); *C04B 2103/10* (2013.01); *C04B 2111/00017* (2013.01); *Y02P 40/10* (2015.11); *Y02W 30/91* (2015.05)

(58) Field of Classification Search
CPC ........... C04B 40/0028; C04B 40/0071; Y02W 30/91; B28B 1/525; B28B 3/02; Y02P 40/10
See application file for complete search history.

(56) References Cited

U.S. PATENT DOCUMENTS

| | | | |
|---|---|---|---|
| 2009/0260770 A1* | 10/2009 | Cao | ........................ E04B 1/86 162/202 |
| 2016/0145153 A1 | 5/2016 | Hwang et al. | |
| 2016/0244364 A1* | 8/2016 | Kalliola | ................. C04B 28/04 |
| 2016/0340252 A1* | 11/2016 | Kumar | ................. C04B 28/006 |
| 2017/0057872 A1* | 3/2017 | Easton | ................... B28B 15/00 |
| 2017/0204008 A1* | 7/2017 | Willis | ................... C04B 18/021 |
| 2020/0361820 A1* | 11/2020 | Moradi Khou | ....... C04B 22/064 |
| 2022/0048001 A1* | 2/2022 | Liu | ......................... C08H 6/00 |

OTHER PUBLICATIONS

Properties of Rice Straw Cementitious Composite, Submitted to Department of Civil Engineering and Geodesy For the Degree of Doctor of Engineering, Mohamed Ibrahim Nasr Morsy Dec. 25, 2011 (Nov. 25, 2011) whole document (169 pages).

Experimental Investigation on Strength and Durability Characteristics of Multi Blended Cement Concrete, The Asian Review of Civil Engineering ISSN: 2249-6203 vol. 6 No. 2, 2017, pp. 20-22 abstract, p. 21, figure-1, tables-I-IV (3 pages).

Strength and Durability Performance of Alkali-Activated Rice Husk Ash Geopolymer Mortar, Strength and Durability Performance of Alkali-Activated Rice Husk Ash Geopolymer Mortar, Yun Yong Kim et al. http://dx.doi.org/10.1155/2014/209584 Nov. 23, 2014 (Nov. 23, 2014) abstract, p. 3, figure-2, Table-2, p. 6, figure-6 (11 pages).

Mix Design and Mechanical Properties of Fly Ash and GGBFS-Synthesized Alkali-Activated Concrete (AAC), Ramamohana Reddy Bellum et al. https://doi.org/10.3390/infrastructures4020020 May 2, 2019 (May 2, 2019) abstract, pp. 5-6, tables-5-7 (12 pages).

* cited by examiner

Figure 1: Manufacturing Plant Layout

VEGETAL CONCRETE MASONRY UNIT AND METHOD AND SYSTEM FOR MANUFACTURE THEREOF

CROSS REFERENCE TO RELATED APPLICATIONS

This application is a U.S. National Phase Application under 35 U.S.C. 371 of International Application No. PCT/IN2021/050055, filed on Jan. 21, 2021, which claims priority to Indian Patent Application No. 202041002654, filed on Jan. 21, 2020. The entire disclosures of the above applications are expressly incorporated by reference herein.

FIELD OF THE INVENTION

The present invention relates to a product and process for the preparation of a building material and in particular relates to environmentally sustainable eco-friendly green concrete building blocks made of bio-composite materials comprising geopolymers, lime, agricultural and industrial waste. More particularly, the present invention relates to method and system for manufacturing a vegetal concrete masonry unit.

BACKGROUND OF THE INVENTION

Rapid industrialization and urbanization in present-day society has spurred construction at an alarming rate, boosting the demand for construction materials. Typically, cement-based concretes containing coarse and fine aggregates, which are usually comprised of stone, sand and water, are the materials most abundantly used in building construction. Continuous production of such aggregates has led to serious depletion of natural resources and is an emerging problem in recent times. In addition, conventional building materials account for high production costs, high greenhouse gas emissions, and generate a high demand of energy and water resources, all of which have a significantly negative environmental impact.

For instance, production of conventional building materials contributes to increased emissions of noxious pollutants, acceleration of climate change and depletion of topsoil through mining. Concurrently, on the other hand, amassing of unmanageable quantities of industrial and agricultural solid waste, particularly in developing countries has intensified environmental concerns relating to their disposal. For example, routine burning of unwanted agricultural crop residue is a global phenomenon and an important contributor to abject air quality worldwide. Lack of effective and environmentally sustainable management of industrial and agricultural residues and waste is a mounting risk for the environment and causes air, surface water and ground water pollution.

Drawbacks of conventional concrete materials, need for conservation of natural resources, availability of limited landfill spaces, unmanageable industrial and agricultural solid waste and the desire of nations to reduce green-house gas emission has spurred the demand for alternative high quality concrete products. The gradual depletion of raw materials has fostered increased demand for recycled building materials which can replace traditional building products. Hence, recycling of wastes into sustainable environmentally friendly construction materials could be a feasible and potentially cost-effective solution to not only combat waste pollution problem by keeping them out of the waste stream, but also as an economical alternative to the design of green sustainable concrete buildings.

In recent years, the application of green building materials has become popular in many countries. Green buildings made from materials using agricultural waste or industrial waste proffer numerous environmental, technical and economic benefits such as increased strength and durability, improved workability, reduced permeability, superior resistance to acid attack and fire, minimum requirement of energy, improved thermal behavior, cost-effectiveness, 80% fewer carbon dioxide emission than normal concrete there by reducing environment pollution, can also contribute to improved indoor and outdoor air quality and a healthy and more productive indoor environment.

The prior art documents on agricultural waste building materials include hydraulic lime, calcic lime and other commercial lime-based binders, and also include geopolymer as binders, which is an alkali-activated mineral material produced through polycondensation of inorganic compounds at ambient or slightly elevated temperatures. An example of such a reaction includes aluminosilicate with an alkaline activator such as concentrated alkali hydroxide, silicate, carbonate, or sulfate. The most promising feature of the geopolymer is its formulation using waste materials such as pulverized fuel ashes, and ground granulated blast furnace slag (GGBFS) as resource materials. The application of vegetal matter such as fibers in concrete improves tensile strength, ductility and post-fracture behavior of composite concretes. Hence, vegetal geopolymer concretes could be provided as an additional layer to an existing structural wall for providing reinforcement of the structural frame and for insulating purpose.

However, previous prior art processes either include vegetal matter only in very small quantities (about 1% by mass) or suffer from problems such as structurally weak material with low compressive strength and non-uniform mechanical performance. Large amounts of activators in traditional geopolymer based vegetal concretes also negate the environmental benefits offered and make them unviable alternatives. Also, traditional fly ash based geopolymers are produced using high temperature curing which makes its manufacture expensive and unviable. Furthermore, prior art processes clearly show that addition of vegetal matter to geopolymers resulted in weakened composites because of incompatibility. Therefore, there is also a need to improve the compatibility between vegetal matter and the geopolymer matrix. There is a constant need to provide a novel, environmentally sustainable and viable process for the preparation of a vegetal concrete masonry unit thereof with better structural or load-bearing function, good thermal insulation and higher compressive strength.

OBJECTS OF THE INVENTION

One of the primary objects of the present invention is to provide a novel, environmentally sustainable and viable process for the preparation of a vegetal concrete masonry unit thereof with performance related advantage over existing products.

Another object of the present invention relates to a novel vegetal concrete masonry unit comprising of crop residues and an alkali activated mineral binder comprised of lime and industrial co-products from steel and power plants.

Another object of the present invention relates to improvement in the mechanical performance of vegetal concrete masonry unit made using the crop residues and an alkali activated mineral binder comprised of lime and industrial co-products from steel and power plants.

Another object of the present invention is to increase the structural durability and structural integrity of the vegetal concrete masonry unit.

Another object of the present invention is to provide a vegetal concrete masonry unit with good thermal insulation.

Another object of the present invention is to provide a vegetal concrete masonry unit with increased load-bearing function and a higher compressive strength.

Another object of the present invention is to utilize agricultural waste to manufacture a vegetal concrete masonry unit with the intention to recycle and resolve agricultural waste pollution problem.

Another object of the present invention is to use following as raw materials for the preparation of a vegetal concrete masonry unit: (a) Crop residues: paddy straw, wheat straw, bagasse, cotton stalk, corn stover, sugar cane trash, sunflower stalk, soy stalk, chia stalk, kenaf stalk, hemp stalk and jute stalk and/or a combination thereof. (b) Binder: ground granulated blast furnace slag and hydrated lime and/or a combination thereof. (c) Other raw materials: fly ash, anhydrous sodium silicate, sodium hydroxide, water and/or a combination thereof.

Yet another object of the present invention is to reduce the amount of alkali activator used in the manufacture of the vegetal concrete masonry unit to make it a viable alternative to conventional masonry units.

A further object of the present invention is to lower the activator content making geopolymers and other geopolymer based vegetal concretes viable for use.

Another object of the present invention is to lower the activator content making geopolymer based vegetal concretes environmentally sustainable.

These and other objects of the present invention will become readily apparent upon further review of the following description.

SUMMARY OF THE INVENTION

One aspect of the present invention relates to a vegetal concrete masonry unit which comprises of cooked crop residues, binder and pulverized fuel ash in a mass ratio of 1:1:1.5 to 1:1.5:3.

Another aspect of the present invention relates to a method for the preparation of a vegetal concrete masonry unit, the method comprising: cooking a crop residue in a cooker such as a pressure cooker with sodium hydroxide (NaOH) and water; mixing hydrated lime, Ground Granulated Blast Furnace Slag (GGBFS), and sodium silicate activator in a ribbon blender to constitute the binder; intermixing the treated crop residue, binder and pulverized fuel ash (PFA) together in a pan mixer with water to form an alkali activated homogeneous paste/gel; and molding the homogenous paste obtained in intermixing step using a high-pressure hydraulic press to form the vegetal concrete masonry unit.

Yet another aspect of the present invention relates to a system for the manufacture of a vegetal concrete masonry unit, the system comprising: a lime silo containing hydrated lime; a activator powder in a ribbon blender to form a binder; a binder silo for storing the binder; a stainless steel cooker for cooking a raw crop residue; a pan mixer for obtaining the wet mix; a cooked crop residue hopper for obtaining the mixture obtained from the stainless steel cooker; wherein the cooked crop residues from hopper, binder from the binder silo and pulverized fuel ash, PFA, hopper are mixed with water in a pan mixer; wherein the wet mix of the pan mixer are casted into molds using hydraulic block machine with a high compacting pressure, and then transported to the stock yard.

The crop residues are cooked in a stainless steel cooker with 20 percent NaOH and water at 150° C. for a duration of 45 minutes. The binder includes hydrated lime of at least 85 percent calcium hydroxide mixed with GGBFS in a 2:3 ratio.

The method also includes providing sodium silicate activator is in an amount equal to 2.5-20% of the total mass of hydrated lime and GGBFS in a ribbon blender to constitute the binder. The binder is further mixed with pulverized fuel ash, cooked crop residues, and water in a pan mixer and cast into molds using a high-pressure hydraulic press with a compacting pressure of up to 10 MPa.

The alkali activated homogeneous paste/gel of the method is Calcium-Alumino-Silicate-Hydrate (C-A-S-H/CASH) gel/paste and wherein the PFA reacts with GGBFS in the presence of an activator powder to form Sodium-Alumino-Silicate-Hydrate (N-A-S-H/NASH) geopolymers, as well as CASH gel. The activator powder is anhydrous sodium silicate powder.

The cooking or treating of the crop residue is carried out in a cooker being a stainless-steel container constructed with a pressure lock system and designed to withstand a total internal pressure of minimum 2 atm.

The binder comprises mixing hydrated lime, Ground Granulated Blast Furnace Slag, and sodium silicate activator in a mass ratio of 2:3:0.5 to 1:6:2.

BRIEF DESCRIPTION OF THE ACCOMPANYING DRAWING

DETAILED DESCRIPTION OF THE PRESENT INVENTION

A novel, environmentally sustainable vegetal concrete masonry unit/brick and viable process and system for the preparation of the same with performance related advantage over existing products is disclosed. The vegetal concrete masonry unit/brick of the present invention finds application in civil constructions in form of blocks and pre-cast wall panels. This vegetal concrete masonry unit may be cast in a hybrid composite construction, where there shall be the core made of this material, encased in a steel frame. These hybrid panel will then be erected on site to make a pre-engineered building.

Thus, the present invention relates to an economically sustainable vegetal concrete masonry unit and the method for manufacturing the same, wherein the vegetal concrete masonry unit comprises of hydrated lime, Ground Granulated Blast Furnace Slag, pulverized fuel ash, cooked crop residues and sodium silicate used in defined amounts. Further, the process for the manufacture of vegetal concrete masonry unit employs a step of treating the crop residue with alkali such as sodium hydroxide increasing the homogeneity of the material mixture and eliminates the set-retarding extracts from the crop residues; and on further addition of binder materials improves the compressive strength of the formed vegetal concrete masonry unit.

In the present invention, lime and Ground Granulated Blast Furnace Slag (GGBFS) act as the main binding agent. The addition of sodium silicate activates the reaction between lime and GGBFS to form Calcium-Alumino-Silicate-Hydrate (C-A-S-H/CASH) gel that creates the matrix to hold the aggregates in the concrete, which are vegetal matter and pulverized fuel ash (PFA). Formation of CASH gel is a desirable hydration product that occurs when building limes or Portland cements are mixed with water. The addition of PFA also has an additional role to play. It acts as a fine aggregate as well as a binding agent. The PFA reacts with GGBFS in the presence of the activator to form Sodium-Alumino-Silicate-Hydrate (N-A-S-H/NASH) geopolymers, as well as CASH gel. For the reaction between GGBFS and pulverized fuel ash, the presence of lime (calcium hydroxide) also creates a suitable pH environment to facilitate the reaction. A part of the remaining calcium hydroxide in the mixture mineralizes the cooked crop residues and the other part subsequently turns into calcium carbonate through carbonation. The crop residue is selected from a group of crop residues comprising paddy straw, wheat straw, bagasse, cotton stalk, corn stover, sugar cane trash, sunflower stalk, soy stalk, chia stalk, kenaf stalk and jute stalk and/or a combination thereof. Therefore, changes in activator, lime, GGBFS and pulverized fuel ash content would result in varying amounts of CASH and NASH, thereby affecting the strength of the final vegetal concrete product.

Figure 1:
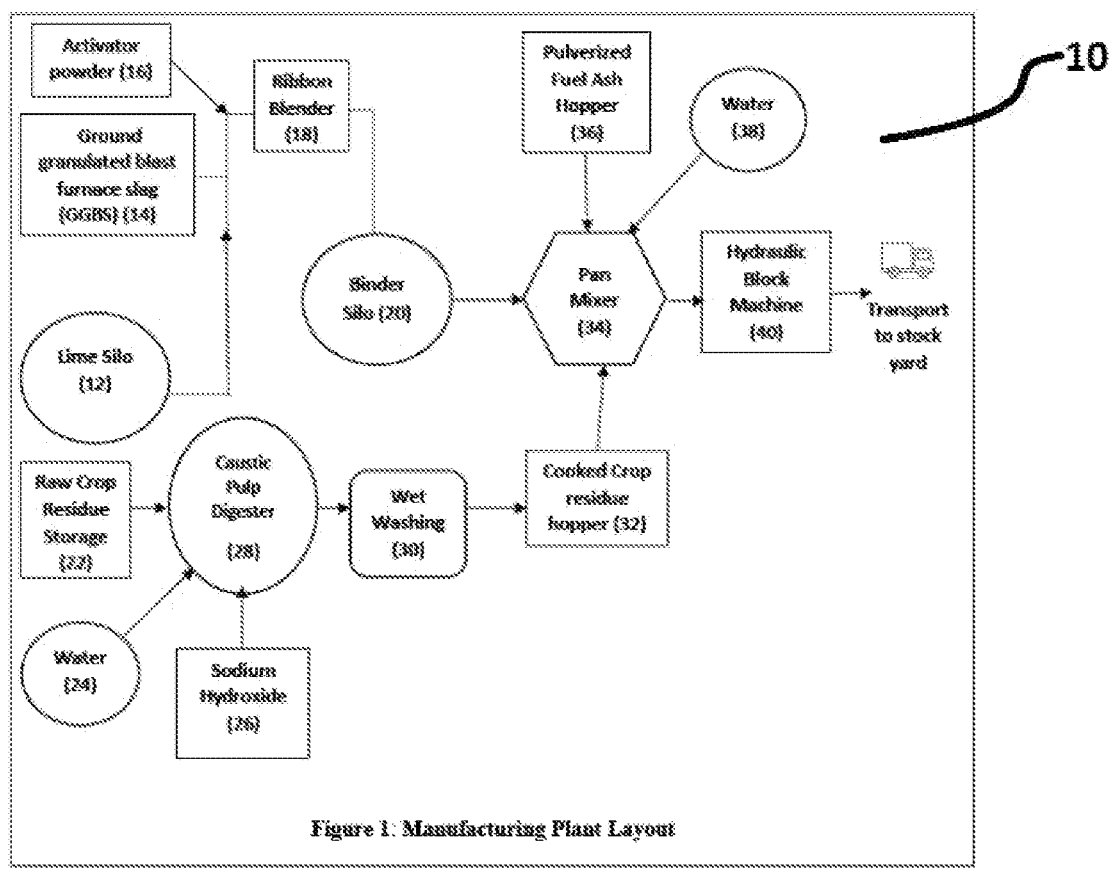
FIG. 1 illustrates a system of manufacturing a vegetal concrete masonry unit according to the present invention.

FIG. 1 discloses a system 10 for manufacturing of a vegetal masonry unit according to the present invention, wherein the system comprising a lime silo 12 containing hydrated lime which is mixed with ground granulated blast furnace slag 14 and a activator powder 16 in a ribbon blender 18 to form a binder which is stored in a binder silo 20, a raw crop residue from the storage 22 is mixed with water 24 and sodium hydroxide 26 in the stainless steel cooker 28, the mixture obtained from the stainless steel cooker 28 is fed to the wet washing 30 and subsequently to the cooked crop residue hopper 32. The cooked crop residues from hopper 32, binder from the binder silo 20 and PFA pulverized fuel ash hopper 36 are mixed with water 38 in a pan mixer 34, wherein, the wet mix of the pan mixer 34 are casted into molds using hydraulic block machine 40 with a high compacting pressure, and then transported to the stock yard.

The crop residues are cooked in a cooker with 20 percent sodium hydroxide (NaOH) and water at 150° C. for a duration of 45 minutes; wherein the binding materials—includes hydrated lime of at least 85 percent calcium hydroxide which is mixed with GGBFS in a 2:3 ratio, and sodium silicate activator of an amount equal to 2.5-20% of the total mass of hydrated lime and GGBFS in a ribbon blender to constitute the binder; wherein the binder is further mixed with pulverized fuel ash, cooked crop residues, and water in a pan mixer and cast into molds with using a high-pressure hydraulic press with a compacting pressure of 10 MPa.

Figure 2:
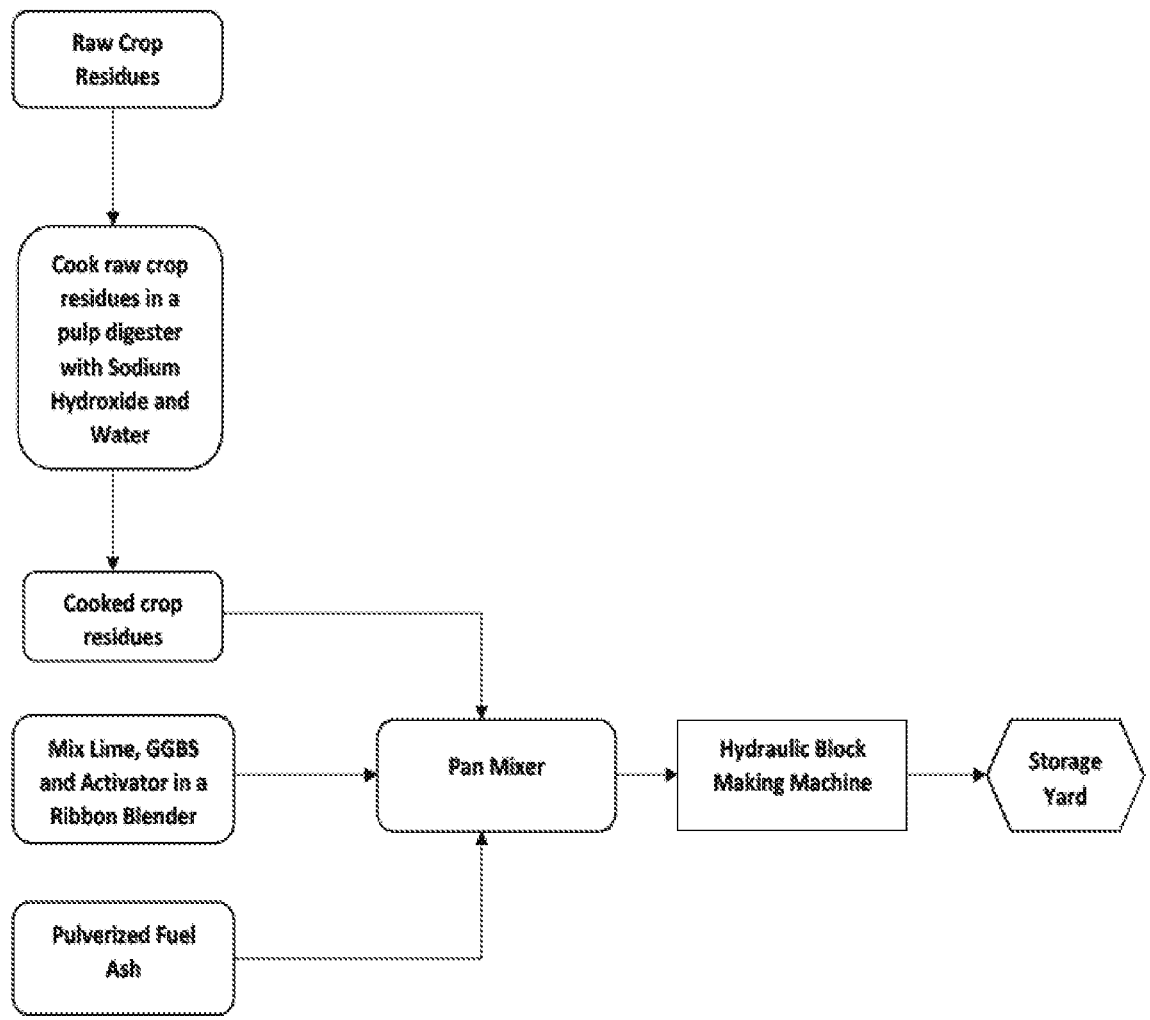
FIG. 2 illustrates a process showing the steps of manufacturing a vegetal concrete masonry unit according to the present invention.

FIG. 2 illustrates a process that shows the steps of manufacturing of vegetal concrete masonry unit according to the present invention which are as below:

1. Processing of Crop Residues

Each kilogram of crop residues, either individually or as a combination of paddy straw, wheat straw, bagasse, cotton stalk, corn stover, sugar cane trash, sunflower stalk, soy stalk, chia stalk, kenaf stalk, hemp stalk and jute stalk are added to 5 liters of 0.2 M to 10 M NaOH solution in a stainless-steel container constructed with a pressure lock system and designed to withstand a total internal pressure of minimum 2 atm. The stainless-steel container containing the crop residues and NaOH solution is heated to a temperature of 150° C. and 1 to 2 atm pressure. The temperature and pressure are applied for a duration of 15 to 45 minutes, after which, the crop residues are removed from the container and washed until the water runs clear. The washed residues are de-watered to a saturated condition.

2. Preparation of Binder

Hydrated lime consisting of at least 85% calcium hydroxide is mixed with ground granulated blast furnace slag (GGBFS) having a specific surface area of at least 400 $m^2/kg$ in a ratio of 1:6 to 2:3, respectively. Anhydrous sodium silicate powder of amount equal to 5% to 20% of the combined mass of hydrated lime and GGBFS is added to the mix. The three constituents are blended together for a duration of at least 5 minutes.

3. Preparation of Vegetal Concrete Mix

The processed crop residues in the wet form, the binder, dry fly ash and water are added to a pan mixer in quantities as set out in table 1. The constituents are mixed at least for a duration of 3 minutes.

TABLE 1

| Vegetal concrete, comprehensive | | | |
|---|---|---|---|
| Raw Material | Quantity ($kg/m^3$) | Compressive Strength (MPa) | Dry Density ($kg/m^3$) |
| Pre-mixed binder | 320-400 | 5-7 MPa | 950-1200 |
| Treat crop residues in water saturated condition | 320-380 | | |
| Fly Ash | 500-800 | | |
| Water | 60-100 | | |

4. Production of Vegetal Masonry Unit

The wet mix is transferred to a hydraulic block making machine consisting of a metal die, metal press and hydraulic jack capable of delivering a compression force of 2 MPa to 10 MPa.

In order to more clearly describe the nature of the present invention, specific examples will hereinafter be described. It should be understood, however, that this is done solely by way of example, and is intended neither to delineate the scope of the invention nor limit the ambit of the appended claims.

SPECIFIC EXAMPLES

Example 1 (Paddy Straw)

Step 1: Processing of Crop Residues

Each kilogram of paddy straw is added to 5 litres of 1 M NaOH solution and heated to a temperature of 150° C. in a stainless-steel container. The temperature is maintained for a duration of 45 minutes, after which the paddy straw is removed from the container and washed thoroughly, until the water flows clear. The straw is squeezed and excess water is drained.

Step 2: Preparation of Binder

Hydrated lime consisting of at least 85% calcium hydroxide is mixed with ground granulated blast furnace slag (GGBFS) having a specific surface area of at least 400 $m^2/kg$ in a ratio of 2:3, respectively. Anhydrous sodium silicate powder of amount equal to 20% of the combined mass of hydrated lime and GGBFS is added to the mix. The three constituents are blended together for a duration of at least 5 minutes.

Step 3: Preparation of Vegetal Concrete Mix

The processed crop residues in the wet form, the binder, fly ash and water are added to a pan mixer in quantities as set out in table 2.

Step 4: Production of Vegetal Concrete Masonry Unit

The wet mix is transferred to a hydraulic block making machine consisting of a metal die, metal press and hydraulic jack capable of delivering a compression force of 2 MPa.

TABLE 2

Paddy straw based vegetal concrete, Example 1

| Raw Material | Quantity (kg/m$^3$) | Compressive Strength (MPa) | Dry Density (kg/m$^3$) |
| --- | --- | --- | --- |
| Pre-mixed binder | 400 | 7 MPa | 1086 |
| Treated paddy straw | 380 | | |
| Fly Ash | 556 | | |
| Water | 80 | | |

Example 2 (Paddy Straw)

Step 1: Processing of Crop Residues

Each kilogram of paddy straw is added to 5 litres of 0.5 M NaOH solution and heated to a temperature of 150° C. in a stainless-steel container with a pressure lock lid, with a capacity to withstand 2 atm of pressure. The lid is closed tight, and the temperature is maintained for a duration of 45 minutes, after which the paddy straw is removed from the container and washed thoroughly, until the water flows clear. The straw is squeezed and excess water is drained.

Step 2: Preparation of Binder

Hydrated lime consisting of at least 85% calcium hydroxide is mixed with ground granulated blast furnace slag (GGBFS) having a specific surface area of at least 400 m$^2$/kg in a ratio of 2:3, respectively. Anhydrous sodium silicate powder of amount equal to 20% of the combined mass of hydrated lime and GGBFS is added to the mix. The three constituents are blended together for a duration of at least 5 minutes.

Step 3: Preparation of Vegetal Concrete Mix

The processed crop residues in the wet form, the binder, fly ash and water are added to a pan mixer in quantities as set out in table 3. The constituents are mixed for a duration of 3 minutes.

Step 4: Production of Vegetal Concrete Masonry Unit

The wet mix is transferred to a hydraulic block making machine consisting of a metal die, metal press and hydraulic jack capable of delivering a compression force of 2 MPa.

TABLE 3

Paddy straw based vegetal concrete, Example 2

| Raw Material | Quantity (kg/m$^3$) | Compressive Strength (MPa) | Dry Density (kg/m$^3$) |
| --- | --- | --- | --- |
| Pre-mixed binder | 400 | 7 MPa | 1086 |
| Treated paddy straw | 380 | | |
| Fly Ash | 556 | | |
| Water | 80 | | |

Please note: In the above two examples, preparation of crop residues can happen with NaOH solution having molar concentration between 0.3 M to 10 M. The cooking time and cooking pressure will vary depending on the concentration of the solution.

Example 3 (Paddy Straw)

Step 1: Processing of Crop Residues

Each kilogram of paddy straw is added to 5 litres of 0.5 M NaOH solution and heated to a temperature of 150° C. in a stainless-steel container with a pressure lock lid, with a capacity to withstand 2 atm of pressure. The lid is closed tight, and the temperature is maintained for a duration of 45 minutes, after which the paddy straw is removed from the container and washed thoroughly, until the water flows clear. The straw is squeezed and excess water is drained.

Step 2: Preparation of Binder

Hydrated lime consisting of at least 85% calcium hydroxide is mixed with ground granulated blast furnace slag (GGBFS) having a specific surface area of at least 400 m$^2$/kg in a ratio of 1:5.67, respectively. Anhydrous sodium silicate powder of amount equal to 15% of the combined mass of hydrated lime and GGBFS is added to the mix. The three constituents are blended together for a duration of at least 5 minutes.

Step 3: Preparation of Vegetal Concrete Mix

The processed crop residues in the wet form, the binder, fly ash and water are added to a pan mixer in quantities as set out in table 4. The constituents are mixed for a duration of 3 minutes.

Step 4: Production of Vegetal Concrete Masonry Unit

The wet mix is transferred to a hydraulic block making machine consisting of a metal die, metal press and hydraulic jack capable of delivering a compression force of 2 MPa.

TABLE 4

Paddy straw based vegetal concrete, Example 3

| Raw Material | Quantity (kg/m$^3$) | Compressive Strength (MPa) | Dry Density (kg/m$^3$) |
| --- | --- | --- | --- |
| Pre-mixed binder | 340 | 5 MPa | 1173 |
| Treated paddy straw | 360 | | |
| Fly Ash | 713 | | |
| Water | 80 | | |

Example 4 (Wheat Straw)

Step 1: Processing of Crop Residues

Each kilogram of wheat straw is added to 5 litres of 0.5 M NaOH solution and heated to a temperature of 150° C. in a stainless-steel container with a pressure lock lid, with a capacity to withstand 2 atm of pressure. The lid is closed tight, and the temperature is maintained for a duration of 35 minutes, after which the wheat straw is removed from the container and washed thoroughly, until the water flows clear. The straw is squeezed and excess water is drained.

Step 2: Preparation of Binder

Hydrated lime consisting of at least 85% calcium hydroxide is mixed with ground granulated blast furnace slag (GGBFS) having a specific surface area of at least 400 m$^2$/kg in a ratio of 2:3, respectively. Anhydrous sodium silicate powder of amount equal to 20% of the combined mass of hydrated lime and GGBFS is added to the mix. The three constituents are blended together for a duration of at least 5 minutes.

Step 3: Preparation of Vegetal Concrete Mix

The processed crop residues in the wet form, the binder, fly ash and water are added to a pan mixer in quantities as set out in table 5. The constituents are mixed for a duration of 3 minutes.

Step 4: Production of Vegetal Concrete Masonry Unit

The wet mix is transferred to a hydraulic block making machine consisting of a metal die, metal press and hydraulic jack capable of delivering a compression force of 2 MPa.

TABLE 5

Wheat straw based vegetal concrete, Example 4

| Raw Material | Quantity (kg/m$^3$) | Compressive Strength (MPa) | Dry Density (kg/m$^3$) |
|---|---|---|---|
| Pre-mixed binder | 400 | 7 MPa | 1086 |
| Treated wheat straw | 380 | | |
| Fly Ash | 556 | | |
| Water | 80 | | |

Example 5 (Bagasse)

Step 1: Processing of Crop Residues

Each kilogram of bagasse is added to 5 litres of 0.5 M NaOH solution and heated to a temperature of 150° C. in a stainless-steel container with a pressure lock lid, with a capacity to withstand 2 atm of pressure. The lid is closed tight, and the temperature is maintained for a duration of 15 minutes, after which the bagasse is removed from the container and washed thoroughly, until the water flows clear. The washed bagasse is squeezed, and excess water is drained.

Step 2: Preparation of Binder

Hydrated lime consisting of at least 85% calcium hydroxide is mixed with ground granulated blast furnace slag (GGBFS) having a specific surface area of at least 400 m$^2$/kg in a ratio of 1:5.67, respectively. Anhydrous sodium silicate powder of amount equal to 20% of the combined mass of hydrated lime and GGBFS is added to the mix. The three constituents are blended together for a duration of at least 5 minutes.

Step 3: Preparation of Vegetal Concrete Mix

The processed crop residues in the wet form, the binder, fly ash and water are added to a pan mixer in quantities as set out in table 6. The constituents are mixed for a duration of 3 minutes.

Step 4: Production of Vegetal Concrete Masonry Unit

The wet mix is transferred to a hydraulic block making machine consisting of a metal die, metal press and hydraulic jack capable of delivering a compression force of 2 MPa.

TABLE 6

Bagasse based vegetal concrete, Example 5

| Raw Material | Quantity (kg/m$^3$) | Compressive Strength (MPa) | Dry Density (kg/m$^3$) |
|---|---|---|---|
| Pre-mixed binder | 320 | 5.2 MPa | 1175 |
| Treated bagasse | 335 | | |
| Fly Ash | 760 | | |
| Water | 80 | | |

Example 6 (Bagasse)

Step 1: Processing of Crop Residues

Each kilogram of bagasse is added to 5 litres of 1 M NaOH solution and heated to a temperature of 100° C. in a stainless-steel container with a pressure lock lid, with a capacity to withstand 2 atm of pressure. The lid is closed tight, and the temperature is maintained for a duration of 15 minutes, after which the bagasse is removed from the container and washed thoroughly, until the water flows clear. The washed bagasse is squeezed, and excess water is drained.

Step 2: Preparation of Binder

Hydrated lime consisting of at least 85% calcium hydroxide is mixed with ground granulated blast furnace slag (GGBFS) having a specific surface area of at least 400 m$^2$/kg in a ratio of 1:5.67, respectively. Anhydrous sodium silicate powder of amount equal to 15% of the combined mass of hydrated lime and GGBFS is added to the mix. The three constituents are blended for a duration of at least 5 minutes.

Step 3: Preparation of Vegetal Concrete Mix

The processed crop residues in the wet form, the binder, fly ash and water are added to a pan mixer in quantities as set out in table 6. The constituents are mixed for a duration of 3 minutes.

Step 4: Production of Vegetal Concrete Masonry Unit

The wet mix is transferred to a hydraulic block making machine consisting of a metal die, metal press and hydraulic jack capable of delivering a compression force of 2 MPa.

TABLE 6

Bagasse based vegetal concrete, Example 6

| Raw Material | Quantity (kg/m$^3$) | Compressive Strength (MPa) | Dry Density (kg/m$^3$) |
|---|---|---|---|
| Pre-mixed binder | 380 | 10.8 MPa | 1260 |
| Treated bagasse | 335 | | |
| Fly Ash | 700 | | |
| Water | 50 | | |

I claim:

1. A method for the preparation of a vegetal concrete masonry unit, the method comprising:
    cooking crop residue in a cooker with sodium hydroxide (NaOH) and water to yield crop residue;
    washing the cooked crop residue obtained from the cooker to yield a washed crop residue;
    mixing hydrated lime, Ground Granulated Blast Furnace Slag (GGBFS) having a specific surface area of at least 400 m$^2$/kg, and sodium silicate activator powder for at least 5 minutes in a ribbon blender to constitute a binder;
    intermixing the washed crop residue, the binder and pulverized fuel ash (PFA) together in a pan mixer with water to form an alkali activated homogeneous paste/gel; and
    molding the homogenous paste/gel obtained in the intermixing step using a high-pressure hydraulic press capable of delivering a minimum pressure of 2 MPa to form the vegetal concrete masonry unit;
    wherein the crop residue is cooked in a cooker with 0.2 M to 10 M NaOH aqueous solution at 150° C. for a duration of 15 to 45 minutes to improve compatibility between the crop residue and the binder;
    wherein the hydrated lime in the binder wherein at least 85 percent calcium hydroxide and is mixed with GGBFS in a 1:6 to 2:3 ratio; and
    wherein the sodium silicate activator is in an amount equal to 2.5-20% of the total mass of the hydrated lime and the GGBFS in the ribbon blender to constitute the binder.

2. The method as claimed in claim 1, wherein the homogenous paste/gel is cast into molds using the high-pressure hydraulic press with a compacting pressure of up to 10 MPa.

3. The method as claimed in claim 1, wherein the homogeneous paste/gel is Calcium-Alumino-Silicate-Hydrate (C-A-S-H/CASH) paste/gel.

4. The method as claimed in claim 1, wherein the intermixing includes reacting the PFA and GGBFS with a sodium silicate activator powder to form Sodium-Alumino-Silicate-Hydrate (N-A-S-H/NASH) geopolymers, as well as CASH paste/gel.

5. The method as claimed in claim 4, wherein the activator powder is anhydrous sodium silicate powder.

6. The method as claimed in claim 1, wherein the cooking of the crop residue is carried out in the cooker; and
   wherein the cooker is a stainless-steel container constructed with a pressure lock system and configured to withstand a total internal pressure of a minimum of 2 atm.

7. The method as claimed in claim 1, wherein the cooking of the crop residue includes washing the crop residue until the water runs clear and de-watering the washed residue to a saturated condition.

8. The method as claimed in claim 1, wherein the intermixing is conducted for a duration of 3 minutes.

9. The method as claimed in claim 1, wherein the molding is carried out through a hydraulic block making machine including a metal die, metal press and hydraulic jack configured to deliver a compression pressure of 2 MPa to 10 MPa.

\* \* \* \* \*